B. ROUS.
FORMING BLOCK AND ITS APPURTENANCES FOR NECK MAKING MACHINES.
APPLICATION FILED JULY 10, 1912.
1,086,224.
Patented Feb. 3, 1914.
3 SHEETS—SHEET 1.
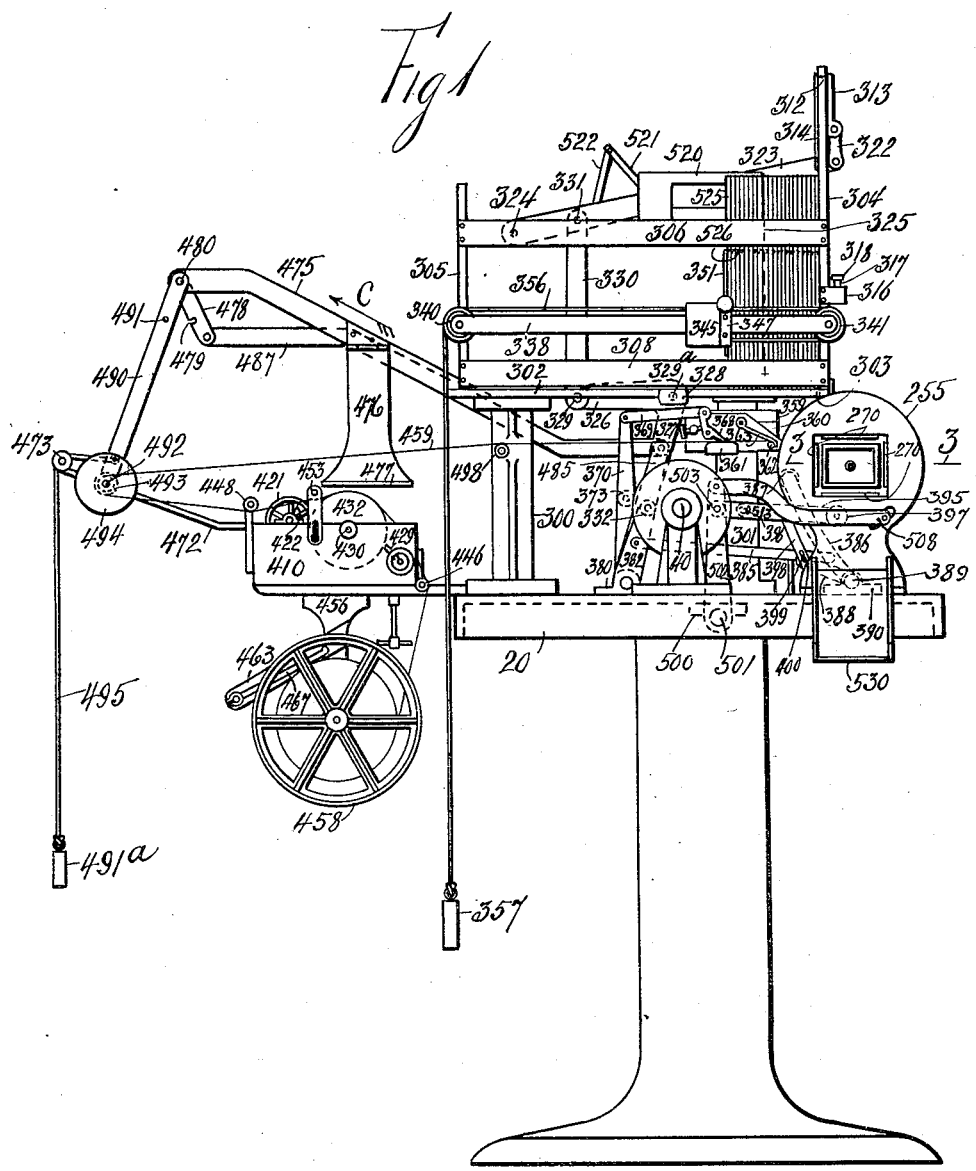
WITNESSES:
INVENTOR
Bernard Rous
BY
ATTORNEY B. ROUS.
FORMING BLOCK AND ITS APPURTENANCES FOR NECK MAKING MACHINES.
APPLICATION FILED JULY 10, 1912.
1,086,224.
Patented Feb. 3, 1914.
3 SHEETS—SHEET 2.
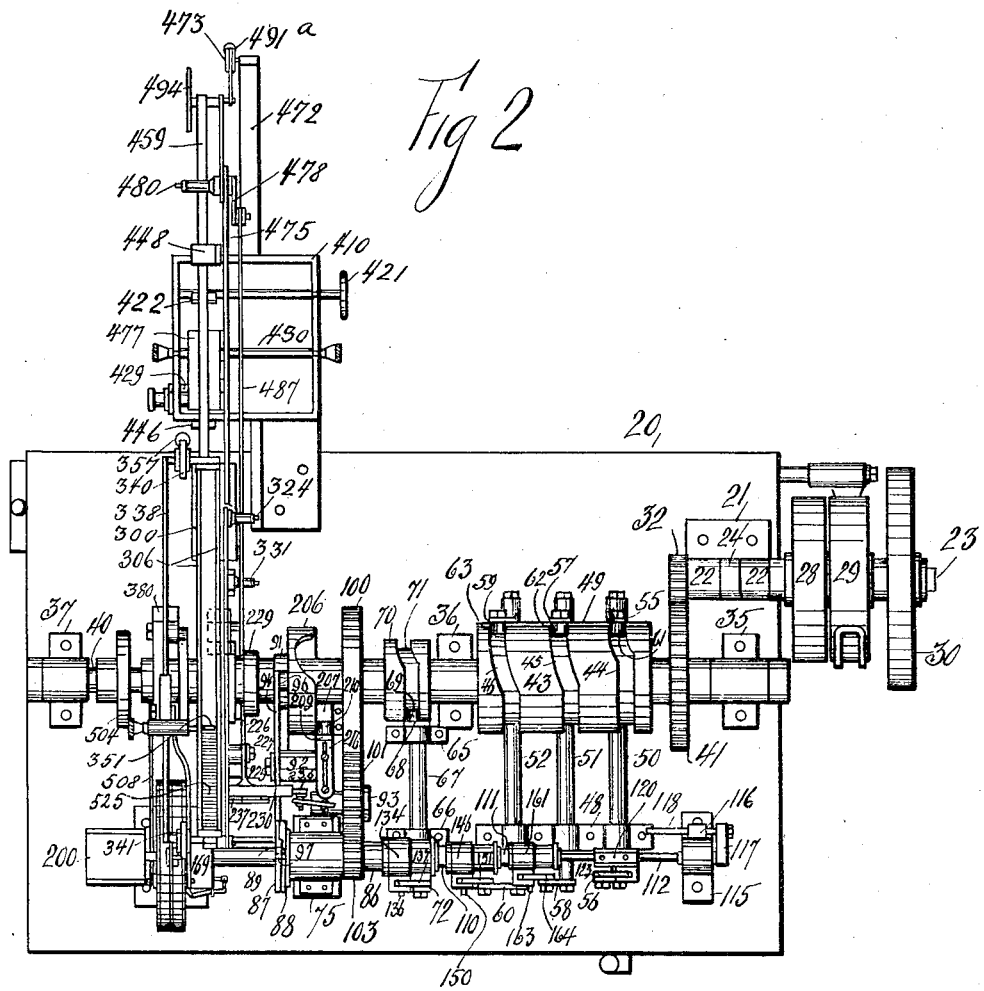
WITNESSES:
P. W. Hubb
Anna Slutsky
INVENTOR
Bernard Rous
BY
Aielde Bonnealle
ATTORNEY

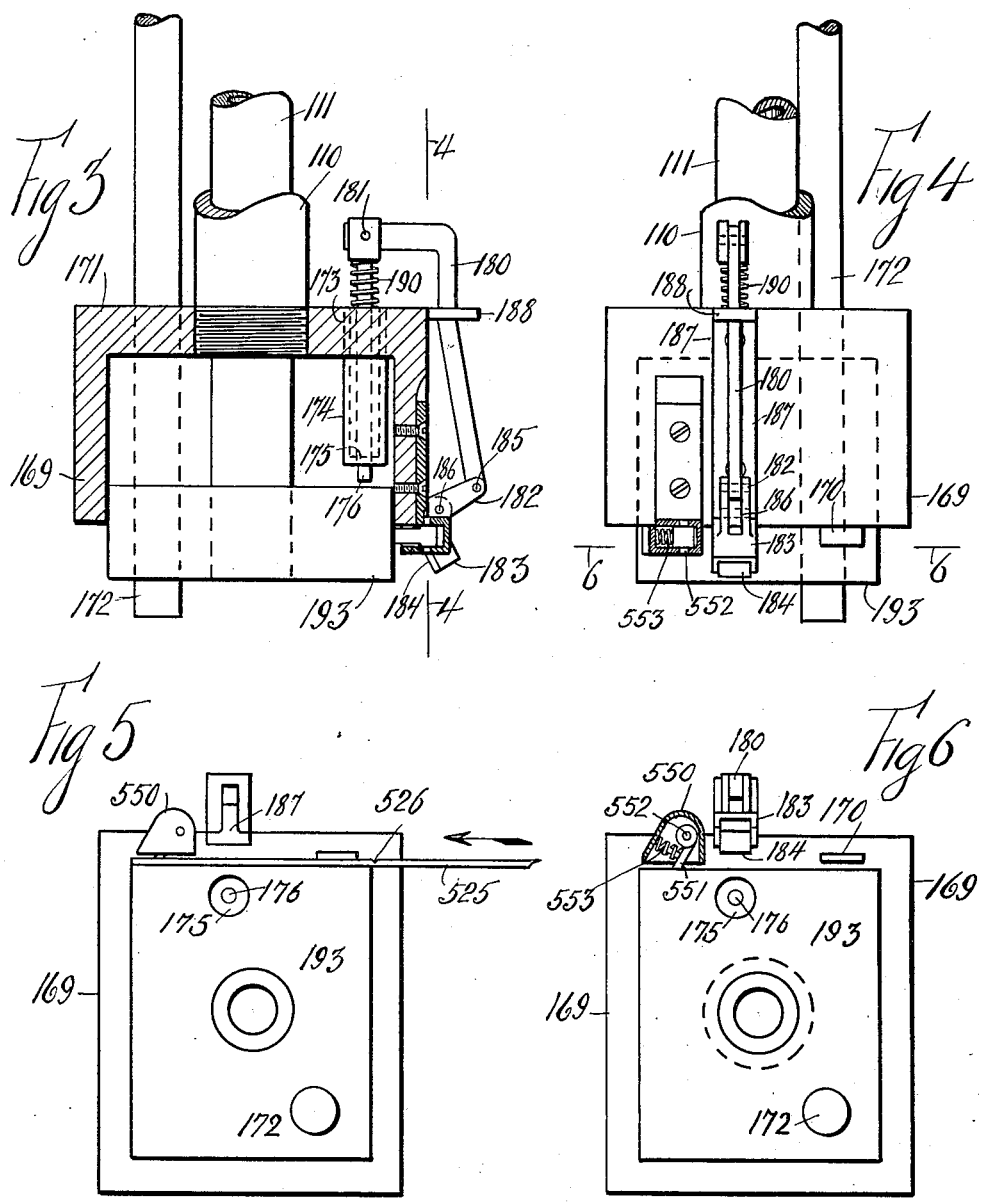

UNITED STATES PATENT OFFICE.

BERNARD ROUS, OF BROOKLYN, NEW YORK, ASSIGNOR TO LOUIS HEFTER, OF NEW YORK, N. Y.

FORMING-BLOCK AND ITS APPURTENANCES FOR NECK-MAKING MACHINES.

1,086,224. Specification of Letters Patent. Patented Feb. 3, 1914.

Original application filed February 7, 1912, Serial No. 676,083. Divided and this application filed July 10, 1912. Serial No. 708,562.

*To all whom it may concern:*

Be it known that I, BERNARD ROUS, citizen of the United States, and resident of the borough of Brooklyn, in the county of Kings and State of New York, have invented certain new and useful Improvements in Forming-Blocks and Their Appurtenances for Neck-Making Machines, of which the following is a specification.

This invention relates to forming blocks and their appurtenances for neck making machines.

This application is a sub-division of my patent application, filed February 7th, 1912, Serial Number 676,083, and for the purpose of showing and describing the functions of the invention a complete neck making machine is shown therewith.

In the accompanying drawings Figure 1 represents the front view of a neck making machine exemplifying the invention, Fig. 2 shows a top plan view of Fig. 1, Fig. 3 represents a fragmentary enlarged section of Fig. 1 on the line 3, 3, Fig. 4 shows a right hand view of the elements shown in Fig. 3 with a section as on the line 4, 4, of said Fig. 3, Fig. 5 is a front view of the elements shown in Fig. 4 and Fig. 6 shows a front view of Fig. 4 with a partial section of Fig. 4 on the line 6, 6.

The machine is shown to comprise the table 20 supporting the bracket 21 having the bearings 22, and in which latter is journaled the driving shaft 23. A collar 24 fastened to the shaft 23 in interposed between the bearings 22 to prevent the lateral displacement of said shaft. A tight pulley 28 is fastened to the shaft 23 and a loose pulley 29 is journaled thereon. A balance wheel 30 is fastened to the shaft 23, and a pinion 32 is also fastened to said shaft.

Journal brackets 35, 36 and 37 are fastened to and extend up from the table 20, and a cam shaft 40 is journaled in said three brackets. A spur gear 41 is fastened to the shaft 40 and meshes with the pinion 32. A cam drum 43 with the groove cams 44, 45, 46 is fastened to the shaft 40. A journal bracket 48 with a plurality of bearings and a similar journal bracket 49 with a plurality of bearings are supported on the table 20. Spindles 50, 51, 52 are supported in the accompanying bearings of the brackets 48 and 49. To the spindle 50 are fastened the arms 55 and 56, to the spindle 51 are fastened the arms 57 and 58, and to the spindle 52 are fastened the arms 59 and 60. The arms 55, 57 and 59 have respectively journaled at their upper ends the rollers 61, 62 and 63 which latter respectively engage the groove cams 44, 45 and 46. On the table 20 are supported the journal brackets 65 and 66 in which is journaled the spindle 67. At one end of the spindle 67 is fastened the arm 68 to which latter is journaled the roller 69. A cam 70 with the groove cam 71 is supported on the shaft 40, the groove 71 engaging the roller 69. On the other end of the spindle 67 is fastened the arm 72. On the table 20 is supported the journal bracket 75. An outer sleeve 86 has fastened thereto the toe 87, which can register with a disk 88 fastened to a sleeve in the bracket 75.

A cam 91 is fastened to the cam shaft 40. A double bracket with the lugs 92, 93 is supported on the table 20. A lever 94 is pivoted on a pin supported in the lug 92. One end of the lever 94 has journaled thereto a roller 96 that engages the cam 91 and at the other end thereof is formed a toe 97 that can register with a notch 89 in the disk 88.

A sector 100 is fastened to the shaft 40 and can mesh with a gear 101 journaled on a pivot secured in the lug 93. A gear 103 is connected to the sleeve 85 and meshes with the gear 101.

A second or intermediate tubular sleeve 110 is slidably supported in the sleeve 86, and a third or inner sleeve 111 is slidably supported in the sleeve 110. A plunger rod 112 is slidably supported within the sleeve 111.

A bracket 115 secured upon the table 20 supports one end of the plunger rod 112. A supplemental bracket 116 is fastened to the bracket 115. An arm 117 has one end fastened to the rod 112, and the other end of the arm carries a stop pin 118 which extends through the supplemental bracket 116, whereby the plunger rod 112 is enabled to reciprocate but is prevented from turning.

A sleeve bracket 120 is fastened to the plunger rod 112. The bracket 120 carries one end of the link 123, the other end of which latter is pinned to the arm 56, and by virtue of the connections of said arm with the cam drum 43 the plunger rod 112 receives its requisite reciprocation.

A sleeve bracket 134 is supported upon the outer sleeve 86. The bracket 134 carries a pin 136 for one end of the link 137, the other end of which latter is pinned to the arm 72, and by virtue of the connections of said arm with the cam drum 43 the outer sleeve 86 receives its requisite reciprocations.

A sleeve bracket 146 is supported upon the sleeve 110. The bracket 146 carries a pin 150 for one end of the link 151, the other end of which latter is pinned to the arm 60, and by virtue of the connections of said arm with the cam drum 43 the second sleeve 110 receives its requisite reciprocations.

A sleeve bracket 161 is supported upon the third sleeve 111. The bracket 161 carries a pin 163 for one end of the link 164, the other end of which latter is pinned to the arm 58. By virtue of the connections of the arm 58 with the cam drum 43, the third sleeve 111 receives its requisite reciprocations. The second or intermediate tubular sleeve 110 has fastened thereto the hollow rectangular guide box 169 with the finger 170. Its rear wall 171 contains a guide opening for the guide and driving rod 172, which latter extends through a guide opening in the toe 87 and has one end thereof fastened to the disk 88. In the rear wall 171 of the guide box 169 is formed an opening 173 in which is secured a thimble 174 with the end wall 175. A plunger 176 is located within the opening 173 and extends through an opening in the end wall 175. A lever 180 has one end pinned to the plunger 176 by means of the pin 181, and the other end thereof is pinned to the arm 182 of the clamping toe 183, having a facing of rubber 184, by means of the pin 185. The said toe is pivoted by means of the hinge pin 186 to the hinge bracket 187. A U shaped guide bracket 188 extends from the said hinge bracket 187 to guide the lever 180. A spring 190 encircles the plunger 176 and bears between the wall 175 and one end of the lever 180. To the third or inner sleeve 111 is fastened the rectangular forming block 193, which has an opening for the guide and driving rod 172. It is slidably supported in the guide box 169.

A rectangular carrier 200 is supported on the plunger rod 112. On the cam shaft 40 is fastened a cam 206. A bearing 207 extends from the table 20 and carries a pin on which is pivoted a lever 209. A roller 210 is journaled on the lever 209 and engages the cam 206. From the lever 209 extends the plate 216. A bell crank with the arms 225, 226 is pivoted on a pin 227 supported in the column 301 to be described. On the end of the arm 226 is journaled a roller that engages a cam 229 supported on the cam shaft 40. The arm 225 has formed therewith the dovetailed guide block 230. A cross-head 236 is slidably carried in the dove-tail of the guide block and supports a pair of shears, that comprise the cutting members 237.

A closer designated generally by the numeral 255 fully described in the original application is located upon the table 20, so that it can coact with the carrier 200.

Columns 300, 301 extend up from the table 20 and carry the frame plate 302 with the opening 303. The plate 302 carries the uprights 304 and 305, which are connected by the upper tie braces 306, 307 and the lower tie braces 308. The upright 304 has formed therein the slot 312 for the pusher block 313. A pusher plate 314 is carried on the block 313. On the upright 304 is fastened a threaded bracket 316 with the adjusting screw 317 having the head 318. The said screw constitutes an adjustable stop for the pusher block 313.

A link 322 has one end pinned to the pusher block 313 and its other end is pinned to the lever 323, which in turn is pinned to the tie braces 307 by means of the pin 324. A spring 325 extends between the lever 323 and one of the braces 308. A bell crank with the arms 326 and 327 is pivoted to the lug 328 extending from the frame plate 302 by means of the pin 329$^a$. The arm 326 carries a pin 329 which is pinned to one end of the link 330, and the latter by means of the pin 331 is connected to the lever 323. The arm 327 has journaled thereto the roller 332, which is in the path of a cam on the cam shaft 40. To the uprights 304, 305 are fastened the guide bar 338 with the pulleys 340, 341. A sliding carriage 345 is supported on the guide bar 338.

A bracket 347 on the carriage 345 supports the pusher plate 351. A pin extends from the carriage and to it is fastened one end of band 356, that extends over the pulleys 341, 340 and the other end of said band carries the weight 357.

In the column 301 is supported a dovetailed guide 359 which slidably supports the carriage 360. The carriage 360 has extending therefrom the table 361 and the roller 362. The carriage 360 has pivoted thereon the bending arm 363.

A pawl 368 is pivoted on the carriage 360 and is pinned to a link 369 which in turn is pinned to the lever 370. The lever 370 has journaled thereto a roller 373 that bears against a cam not shown.

A bracket 380 has pinned thereto a lever 382, and the latter has journaled at its upper end a roller that bears against a cam on the cam shaft 40. A link 385 has one end pinned to the lever 382 and the other end is pinned to one arm 386 of a bell crank having journaled thereto the forming roller 387.

The said bell crank has the second arm 388. A pin 389 supported in bracket 390 carries the said bell crank. A lever 395 has one end pinned to the column 301 by means of the pin 396, and at the other end thereof is journaled the second forming roller 397. A link 398 with an elongated opening 399 connects about the central portion of the lever 395 with the pin 400 of the arm 388, the opening 399 engaging the pin 400. The rollers 387 and 397 are at predetermined intervals located in the path of the forming block 193.

The table 20 supports a paste or glue box 410, supporting a hand wheel 421 and a paper strip cleaning blade 422. In the glue box 410 is pivoted the wheel cleaning blade 429. A shaft 430 is journaled in the glue box for the glue wheel 432. Guide rollers 446, 448 and 453 are provided for the paper band 459. A bracket 456 below the glue box supports a pair of wheels 458 between which is located the reel of the paper band 459. A leg 463 extending from the bracket 456 has pivoted thereto a pressing finger 467.

An arm 472 extends from the glue box 410, and has journaled at its outer end a sheave 473. An arm 475 extends from the upper face of the column 300 and has extending therefrom a guard 476 with a flange 477, that is located over the glue wheel 432. A link 478 with the notch 479 has its upper end pivoted to the upper end of the arm 475, by means of the pin 480. An arm 490 having the pin 491 is pivoted on the pin 480 of the arm 475. The lower end of the arm carries a pin 492 on which is journaled a roller 493. A guide disk 494 is carried on the pin 492. A rope 495 extends over the sheave 473 with one end fastened to the arm 490 and to the other end of the rope is attached the weight 491ª. A link 487 connects the link 478 and a lever 485.

A journal bracket 500 is fastened to the lower face of the table 20. A pin 501 is journaled in the bracket 500 and has pivoted thereto the lever 502. A roller 503 is journaled on the lever 502 which engages a groove cam 504 on the shaft 40.

A connecting rod 508 connects the upper end of the lever 502 with the closer. The pin 501 at the other end thereof carries an arm for the connecting rod 513 that is also connected to the closer.

A counter 520 with the arm 521 is connected to the tie brace 307, and a link 522 connects the arm 521 with the lever 323.

Referring particularly to Figs. 3 to 6 the guide box 169 has formed therewith a hood 550, in which is pinned a catch 551 on a pin 552. A spring 553 bears between the inner surface of the hood and the forming block 193 to pinch the neck that is being formed thereon. The clamping toe 183 is connected to the box as already described.

To operate the machine the paper band 459 is led from its reel over the roller 446 and glue wheel 432, which latter spreads a film of glue or paste on said band, the glue or paste being picked up in the glue box 410 and evenly spread thereon by the blade 429. The paper band then passes under the roller 453, over the scraping blade 422, next under the roller 448, and around the roller 493, over the roller 498 to the table 361. It is prevented from slipping backwardly by the pawl 368, which latter forces the band forwardly with the carriage 360. The band 459 next moves downwardly adjacent to the forming block 193 by the action of the bending arm 363. A plurality of card board strips 525 preferably notched at 526 to enable them to be shaped to form the necks or frames to be formed are located between the tie braces 306 and 307. The pusher plate 351 bears against said strips by virtue of the resulting effect of the weight 357 on the carriage 345, maintaining them with the requisite frictional engagement between said pusher plate and the upright 304. The shaft 23 is rotated by means of a belt not shown engaging the pulley 28. The pinion 32 and gear 41 transmit rotation to the cam shaft 40 and thereby the rollers 61, 62, 63 and 69 impart an oscillating motion to the pairs of arms 55—56, 57—58, 59—60, and 68—72. The said arms respectively reciprocate the plunger rod 112 and the sleeves 111, 110 and 86. After the said sleeves have respectively completed a forward and return stroke, they are turned one revolution by the action of the sector 100 on the gear 101, the latter transmitting rotation to the pinion 103. The lever 94 maintains the disk 88, and consequently the forming block in proper position for each cycle of operations, by reason of the toe 97 locking with the notch 89. The cam 91 controls the engagement of the toe 97 with the notch 89 when the pusher block 313 is rising to the upper end of its stroke, and before pushing down the strip of card board thereunder the forming block with its appurtenances are located as shown particularly in Fig. 5. When the pusher block 313 descends the forming block 193 has rotated to bring the side thereof and the catch 551 extending therethrough in line with one face of the strip and is locked in position. The strips of card board travel to the lower end of said side of the block 193 and are pinched by said catch 551. The distance that the strips are pushed down is controlled by the location of the adjusting screw 317, the latter controlling the stroke of the pusher block 313. About the same time that the strip has been placed in position against the said side of the forming block, the roller 387 brings the glued paper band 459 against said strip of card board. The paper band is fed to the strip by the action of the pawl 368, feeding it toward the bending arm 363, from which latter it is located in proper position to be pushed against said strip by the action of the roller 387. The toe 87 next moves toward the forming block 193 and the heel 183 clamps the strip of card board with its band 459 thereon. The forming block makes about a half of a revolution the heel 183 being released, and after the forming block has nearly made a complete revolution the band 459 is cut by the shears. While the forming block 193 is rotating the rollers 387, 397 are forcing the band and card board strip against the walls of the same. The forming block 193 with the guide box 169 now enter the closer, both the rollers 387 and 397 receding therefrom. The closer now begins its operations by bending bars 270, bending the paper band over the edge of the frame or neck that has been made from the strip. The forming block 193 with its appurtenances now recedes from the closer and at the same time the neck is gripped therein. The carrier 200 now enters the neck and forces the band 459 against the inner surface of the now rectangular card board strip or neck. The closer is released from the necks and the carrier 200 carries them through the closer to be deposited on the chute 530. While the paper band 459 is clamped by the pawl 368, the link 475 moves in the direction of the arrow C, Fig. 1, and the arm 479 engaging the pin 491 causes the link 490 with its roller 493 to move in the same direction. Thereby the paper band 459 is pulled from its reel. The arm 479 next recedes from the pin 491 and the band is maintained in its position by the weight 491ª.

Having described my invention what I desire to secure by Letters Patent and claim is—

1. In a neck making machine the combination of a forming block for a strip of material, a guide box for the block, means to turn the block and box, means to reciprocate the block, means to reciprocate the box, and means on the box to clamp the material to the block.

2. In a neck making machine the combination of a forming block for a strip of material, a guide box for said block, means to turn the block and box, means to reciprocate the block, means to reciprocate the box, a finger extending from the box to guide said strip of material, and means on the box to clamp the said strip of material to the block.

3. In a neck making machine the combination of a forming block for a strip of material, a guide box for said block, means to turn the block and box, means to reciprocate the block, means to reciprocate the box, and a catch on the box to clamp the material to the block.

4. In a neck making machine the combination of a forming block for a strip of material, a guide box for said block, means to turn the block and the box, means to reciprocate the block, means to reciprocate the box, a finger extending from the box to guide the strips of material, a hood extending from the box, a catch pivoted in the hood and a spring bearing between the catch and an inner wall of the hood.

5. In a neck making machine the combination of a forming block for a strip of material, a guide box for said block, means to turn the block and the box, means to reciprocate the block, means to reciprocate the box, a clamping toe pivoted to the box to clamp the strip of material to the block, means to actuate said toe and other means on the box to clamp the strip of material to the block.

Signed at the borough of Manhattan in the county of New York and State of New York this 26th day of June A. D. 1912.

BERNARD ROUS.

Witnesses:
L. I. WIESELTHIER,
A. A. DE BONNEVILLE.